No. 607,418. Patented July 19, 1898.
A. & L. E. BANDEEN.
CRUSHER AND PULVERIZER.
(Application filed Aug. 31, 1897.)
(No Model.) 2 Sheets—Sheet 1.
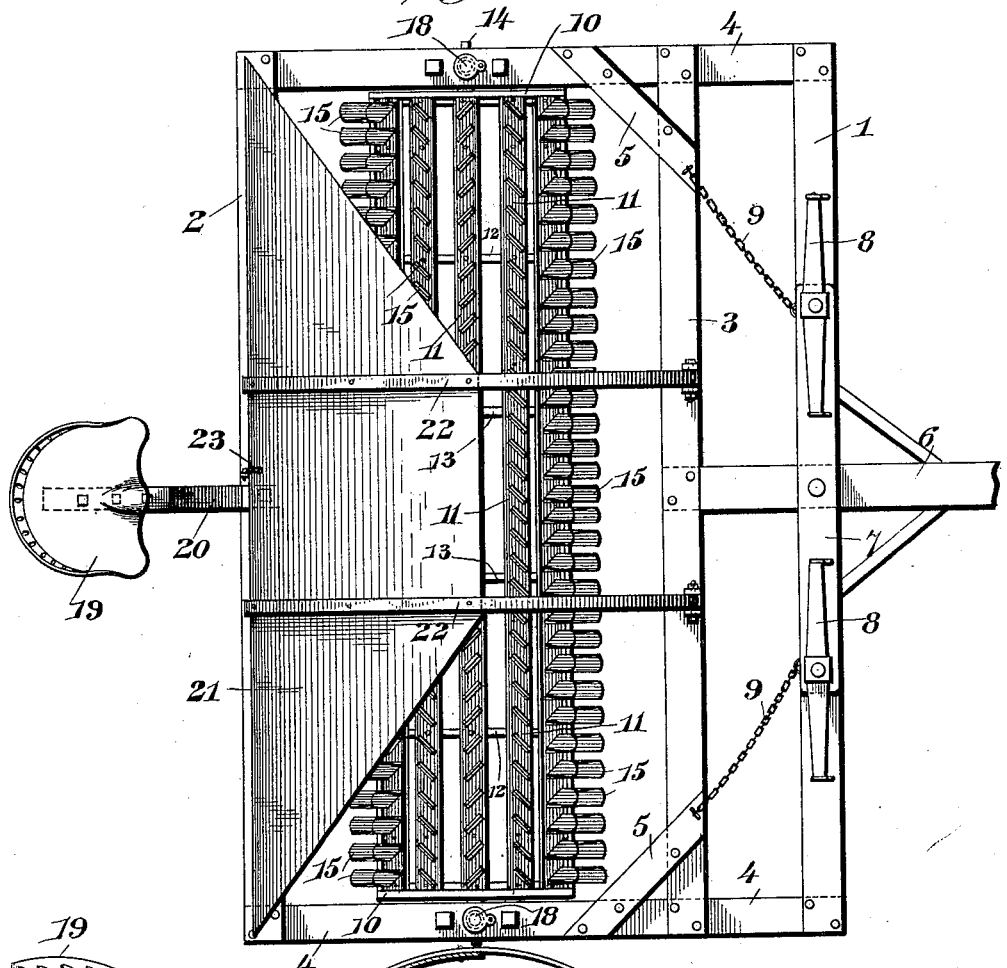
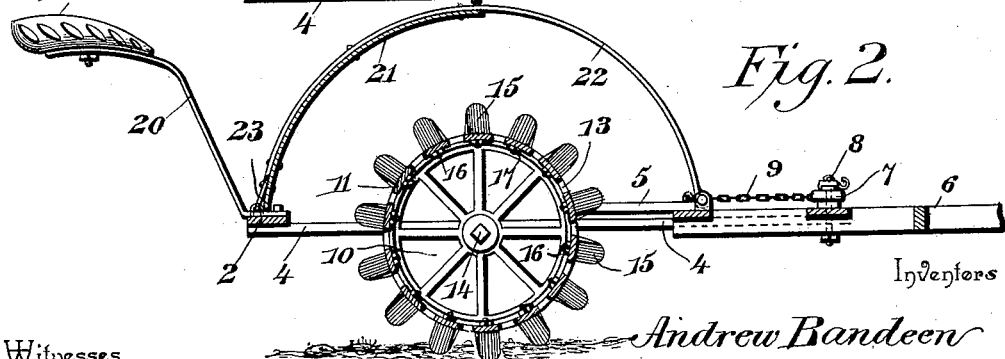
Witnesses
Jas. K. McCathran
V. B. Hillyard
Inventors
Andrew Bandeen
Lloyd E. Bandeen
By their Attorneys,
C. A. Snow & Co.

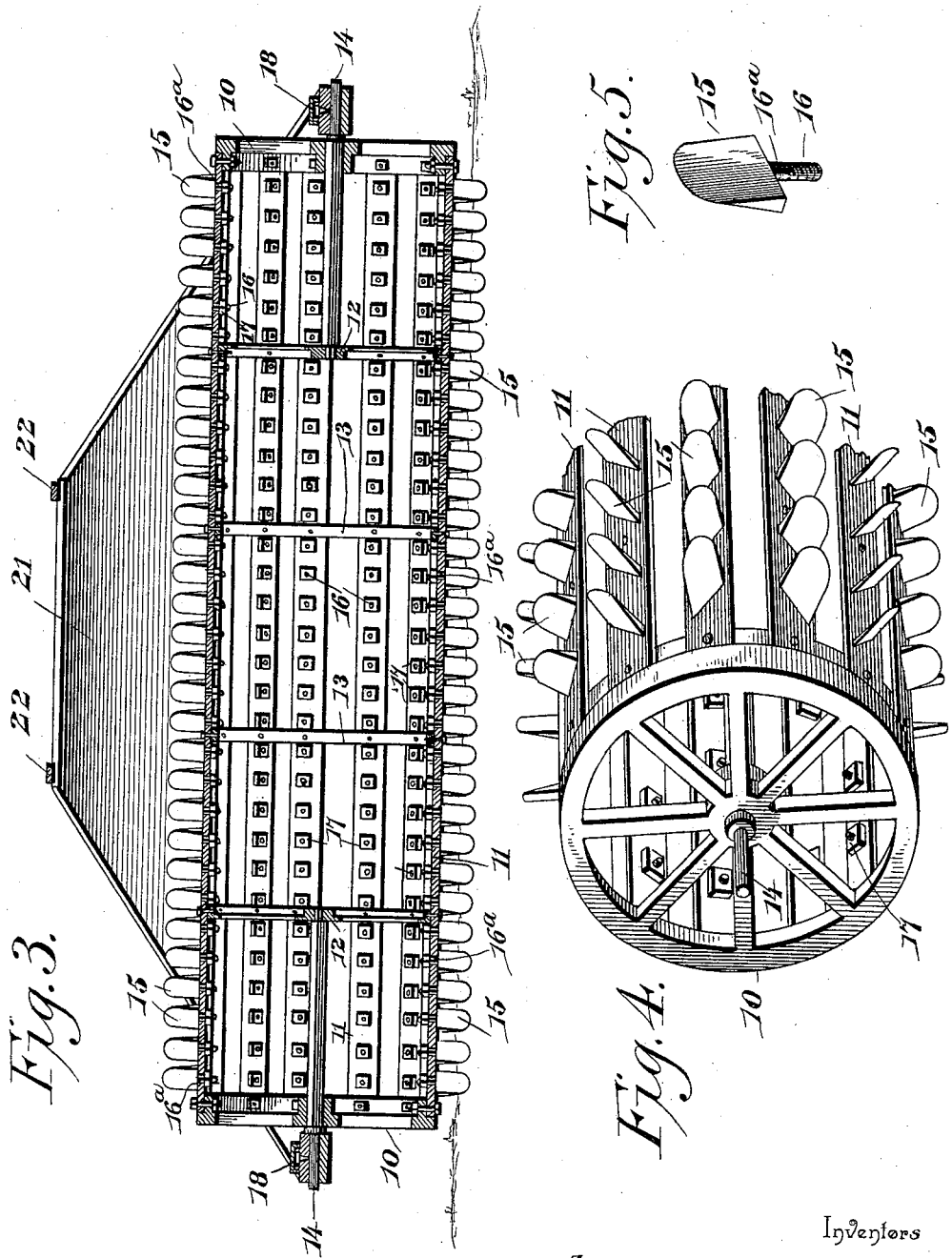

UNITED STATES PATENT OFFICE.

ANDREW BANDEEN AND LLOYD E. BANDEEN, OF NEW ROCHESTER, OHIO.

CRUSHER AND PULVERIZER.

SPECIFICATION forming part of Letters Patent No. 607,418, dated July 19, 1898.

Application filed August 31, 1897. Serial No. 650,160. (No model.)

*To all whom it may concern:*

Be it known that we, ANDREW BANDEEN and LLOYD E. BANDEEN, citizens of the United States, residing at New Rochester, in the county of Wood and State of Ohio, have invented a new and useful Crusher and Pulverizer, of which the following is a specification.

This invention relates to that class of agricultural implements for preparing the soil for the reception of seed and which can be used in meadow-land for reviving it, in stubble-ground for loosening and leveling, and in newly-plowed land for crushing and pulverizing the clods and lumps, the device being in the form of a clod-crusher, and obviating the necessity of harrowing, both operations being accomplished at one time.

The improvement consists of a skeleton roller mounted in a novel manner and studded with parallel rows of teeth reversely inclined and disposed so as to secure a light draft and a thorough pulverizing of the soil and with a view to obviate side movement.

A further object is to improve the general construction, whereby an implement of light and compact arrangement consistent with strength and durability is had and whereby the draft, when turning the device prior to recrossing the field, is applied so as not to strain or snap the pole or tongue.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a top plan view of a clod crusher and pulverizer constructed in accordance with this invention. Fig. 2 is a central longitudinal section thereof. Fig. 3 is a transverse section of the implement longitudinally of the crushing-roller. Fig. 4 is a detail perspective view, on a larger scale, of an end portion of the crushing-roller. Fig. 5 is a detail view of a clod-crushing tooth.

Corresponding and like parts are referred to in the following description and indicated in all the views of the drawings by the same reference characters.

The frame of the implement is of oblong and rectangular shape and is composed of metal bars bolted, riveted, or otherwise firmly secured at their meeting ends, and this frame consists of a front bar 1, a rear bar 2, an intermediate bar 3, side or longitudinal bars 4, and braces 5, the latter spanning the angles formed between the bars 3 and 4 and firmly secured at their ends thereto. A pole or tongue 6 is rigidly attached at its rear end to the bars 1 and 3, at a central point, and is provided with a doubletree 7 and singletree 8. Draft-chains 9 connect the terminals of the doubletree with the front ends of the braces 5 and sustain the major part of the strain incident to turning the implement at the end of a row prior to recrossing the field. It will be understood that when turning the implement the doubletree will swing upon its pivotal connection with the pole 6 and front bar 1, and this turning will be limited by one or the other of the draft-chains, the latter transferring the draft to the brace 5, connected therewith, whereby the pole is relieved of the greater part of the lateral strain, so that the implement is drawn around from one end rather than pushed around by means of the pole, as is generally the case with implements as ordinarily constructed.

The crushing and pulverizing roller is of skeleton form and is composed of heads 10, a plurality of slats 11, secured at their extremities to the heads 10 and disposed in parallel relation and spaced apart, supports 12 a short distance from the heads 10, bracing-rings 13, spindles 14, and teeth 15, secured to the slats 11. Any desired number of teeth will be provided for each slat, depending upon the size and capacity of the implement and the character of land upon which it is to be used. The teeth are wedge shape and have their penetrating ends made rounding and their sides sloping, so as to provide approximately chisel shape edges to the teeth. The teeth are held in place by being supplied with threaded shanks 16, which pass through suitable openings in the slats, and nuts 17, mounted upon the inner projecting threaded extremities of the shank. In order that every part of the land traversed by the implement may be subjected to treatment, the teeth are closely related, and in order that the best results may be attained the teeth are obliquely disposed with reference to the line of motion of the implement. This disposition of the teeth secures a light draft and enables clods and lumps of earth to be thoroughly broken up and pulverized. To equalize and obviate side draft, the teeth applied to intermediate slats incline in one direction and the teeth applied to the alternate slats incline in an opposite direction, as clearly indicated. By having the penetrating ends of the teeth made rounding they are better adapted for entering and leaving the soil and perform the desired work in a more satisfactory manner. The wedge-shaped formation of the teeth renders them practically self-sharpening, as the wearing away of the sides results in maintaining a penetrating edge, as will be readily understood. The teeth are comparatively short and penetrate clods and lumps a sufficient distance to loosen them, and the slats complete the pulverizing action by bearing down upon the clods and compressing them between the toothed slats and the ground. The rings 13 are intended to strengthen and brace the slats at points intermediate of their extremities, whereby the middle portions of the slats are held to the work when the implement is in active operation.

The spindles 14 have their inner ends secured in the supports 12 and are held in the heads 10, and their outer ends are journaled in bearings applied to the side bars 4, said bearings being secured in place in any desired manner. This disposition of the spindles obviates the provision of an axle extending the entire length of the roller and leaves the middle portion of the roller unobstructed, so that trash or other matter lodging within the roller can be readily removed. The journals of the spindles are adapted to be lubricated through oil-holes formed in the side bars 4 and communicating with the journal-bearings, said oil-holes being protected by caps 18, thereby excluding dust and dirt from entering therein. The supports 12, besides receiving the inner ends of the spindles, also serve to strengthen and brace the slats comprising the cylinder.

The driver's seat 19 is adjustably mounted upon the upper end of a standard 20, bolted or otherwise secured to the rear bar 2, and by having the seat adjustable in the manner specified it can be moved toward and from the crushing-roller, so as to balance the framework upon the journals according to the weight of the driver, whereby the weight of the pole or tongue can be relieved from the necks of the team.

A housing 21 extends over the upper rear portion of the roller and consists of a sheet-metal plate curved between its front and rear edges and having its forward corners sheared, as indicated most clearly in Fig. 1, and this plate is secured to curved bars 22, hinged at their front ends to the intermediate bar 3, whereby the housing can be thrown forward out of the way when it is required to expose the upper portion of the roller for any desired purpose. A suitable fastening 23 is provided for holding the rear or free end of the housing down upon the frame and consists of a hook and eye of ordinary formation. This housing may form a rest for the driver's seat and prevents the driver from injurious contact with the roller when the implement is in operation.

In order that the teeth 15 may be held against shifting in use, we preferably square a portion of the shank thereof, as shown at $16^a$, said squared or angular portion being adapted to fit in a correspondingly-shaped opening in the slats.

Having thus described the invention, what is claimed as new is—

1. In an agricultural implement, the combination of a rectangular-shaped frame bearing earth-treating devices, forwardly-convergent braces spanning the angles formed between a transverse and longitudinal bars, a pole or tongue secured to the frame and located intermediate of the braces, a doubletree, and forwardly-convergent draft-chains connecting the extremities of the doubletree with the front terminals of the aforesaid braces, substantially in the manner set forth for the purpose specified.

2. In combination, a frame, a rotary roller bearing a series of earth-treating devices about its surface, a seat attached to the frame and located in the rear of the roller midway of its ends, curved bars extending over the upper portion of the roller and hinged at their front ends to the forward portion of the frame, and a housing extending over the upper rear portion of the roller and secured to the rear portion of the curved bars, and having its front corners cut away, substantially as shown for the purpose set forth.

3. A clod-crushing roller provided with parallel rows of teeth obliquely disposed to the line of motion of the implement, the alternate rows of teeth being inclined in one direction, and the intermediate rows of teeth inclining in an opposite direction, substantially as and for the purpose specified.

4. A clod-crushing roller, comprising a series of toothed slats, circular heads having the terminals of the slats secured thereto, circular supports arranged a short distance from the head and secured to the slats and adapted to strengthen and brace them, and spindles secured to the said heads and supports, substantially as described for the purpose set forth.

5. A clod-crushing roller comprising a series of toothed slats, circular heads having the extremities of the slats secured thereto, circular supports located a short distance from the heads and serving to strengthen and brace the slats, rings supporting the slats intermediate of their ends, and spindles applied to the heads and supports, substantially in the manner set forth for the purpose specified.

In testimony that we claim the foregoing as our own we have hereto affixed our signatures in the presence of two witnesses.

ANDREW BANDEEN.
LLOYD E. BANDEEN.

Witnesses:
  GUY C. NEARING,
  C. R. PAINTER.